(12) United States Patent
Mastrandrea et al.

(10) Patent No.: US 10,084,175 B1
(45) Date of Patent: Sep. 25, 2018

(54) BATTERY SYSTEM ASSEMBLY PRESS

(71) Applicant: Thunder Power New Energy Vehicle Development Company Limited, Central (HK)

(72) Inventors: Francesco Mastrandrea, Milan (IT); Peter Tutzer, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/653,109

(22) Filed: Jul. 18, 2017

Related U.S. Application Data

(62) Division of application No. 15/468,746, filed on Mar. 24, 2017.

(51) Int. Cl.
H01M 10/625 (2014.01)
H01M 2/20 (2006.01)
(Continued)

(52) U.S. Cl.
CPC ......... H01M 2/206 (2013.01); H01M 2/1077 (2013.01); H01M 10/058 (2013.01);
(Continued)

(58) Field of Classification Search
CPC ....... C07K 14/70578; G01N 2333/525; G01N 33/6863; H01R 43/052; H01R 43/28; Y10T 29/53235; Y10T 29/514; Y10T 29/49192; H01M 2/206; H01M 10/613; H01M 10/625; H01M 10/6557
See application file for complete search history.

(56) References Cited

U.S. PATENT DOCUMENTS 3,597,825 A * 8/1971 Meislitzer ............... H01M 2/28
29/730
4,016,638 A * 4/1977 Klein .................... H01M 10/14
29/730
(Continued)

FOREIGN PATENT DOCUMENTS

DE    10 2006 018849 A1    4/2007
EP        3 188 303 A1    7/2017
JP        2013 105626 A    0/5201

OTHER PUBLICATIONS

U.S. Appl. No. 15/468,799, filed Mar. 24, 2017, Non-Final Rejection dated May 15, 2017, all pages.
(Continued)

Primary Examiner — Minh Trinh
(74) Attorney, Agent, or Firm — Kilpatrick Townsend & Stockton LLP

(57) ABSTRACT

A method of manufacturing a battery pack is disclosed. The method includes placing first and second sets of battery cells in first and second battery cell holders of a battery system assembly press, placing a cooling duct in a gap between the first and second sets of battery cells, and applying a first and second forces to the first and second sets of battery cells to cause the first and second sets of battery cells to respectively press against first and second sides of the cooling duct. The method also includes, while applying the first and second forces, placing the first and second plurality of battery cells in a first tray configured to hold the first and second plurality of battery cells.

7 Claims, 11 Drawing Sheets

(51) Int. Cl.
*H01M 10/6557* (2014.01)
*H01M 10/613* (2014.01)
*H01M 10/058* (2010.01)
*H01M 10/0525* (2010.01)
*H01M 2/10* (2006.01)

(52) U.S. Cl.
CPC ..... *H01M 10/0525* (2013.01); *H01M 10/613* (2015.04); *H01M 10/625* (2015.04); *H01M 10/6557* (2015.04)

(56) References Cited

U.S. PATENT DOCUMENTS

| | | | | |
|---|---|---|---|---|
| 4,074,423 | A * | 2/1978 | DiGiacomo | H01M 2/28 164/109 |
| 5,879,833 | A | 3/1999 | Yoshii et al. | |
| 7,291,420 | B2 | 11/2007 | Bitsche et al. | |
| 7,572,549 | B2 | 8/2009 | Wegner | |
| 7,951,477 | B2 | 5/2011 | Wood et al. | |
| 8,263,250 | B2 | 9/2012 | Hermann | |
| 8,563,153 | B2 * | 10/2013 | Lee | H01M 2/1077 429/100 |
| 8,601,943 | B2 * | 12/2013 | Yang | B30B 1/38 100/102 |
| 8,863,542 | B2 | 10/2014 | Damsohn et al. | |
| 8,871,371 | B2 | 10/2014 | Song | |
| 8,895,173 | B2 * | 11/2014 | Gandhi | H01M 2/1077 429/120 |
| 8,920,955 | B1 | 12/2014 | Chuang et al. | |
| 9,151,545 | B2 | 10/2015 | Soukhojak et al. | |
| 9,614,263 | B2 | 4/2017 | Yang et al. | |
| 9,692,030 | B2 | 6/2017 | Schussler et al. | |
| 2004/0069620 | A1 | 4/2004 | Bitsche et al. | |
| 2009/0017366 | A1 * | 1/2009 | Wood | B60L 11/1874 429/62 |
| 2009/0111015 | A1 * | 4/2009 | Wood | H01M 2/1077 429/164 |
| 2010/0306995 | A1 * | 12/2010 | Scheuerman | H01M 2/1077 29/623.1 |
| 2012/0121946 | A1 * | 5/2012 | Eckstein | B60L 11/1874 429/9 |
| 2015/0236386 | A1 | 8/2015 | Yang et al. | |
| 2015/0333304 | A1 * | 11/2015 | Sekine | H01M 2/1077 429/153 |
| 2017/0025657 | A1 | 1/2017 | Reinshagen et al. | |

OTHER PUBLICATIONS

European Search Report for 17189793 dated Nov. 15, 2017, 6 pages.
U.S. Appl. No. 15/468,746, filed Mar. 24, 2017, Non-Final Rejection dated Jul. 31, 2017, all pages.
U.S. Appl. No. 15/468,799, filed Mar. 24, 2017, Final Rejection dated Oct. 3, 2017, all pages.

* cited by examiner

BATTERY SYSTEM ASSEMBLY PRESS

CROSS-REFERENCE TO RELATED APPLICATION

The present application is a divisional of U.S. Nonprovisional application Ser. No. 15/468,746, filed Mar. 24, 2017, the entire contents of which are hereby incorporated by reference for all purposes.

BACKGROUND

An electric vehicle uses one or more electric motors powered by electrical energy stored in a rechargeable battery system. Lithium-based batteries are often chosen for their high power and energy density. In order to ensure that an electric vehicle operates efficiently and safely, the temperature of the battery system must be maintained within a defined range of optimal temperatures. The coolant system of electric vehicle can be physically extended to the battery system to remove excess heat, thereby increasing the service life of the battery system and increasing the distance that can be traveled on a single charge.

As the popularity of electric vehicles increases, efficiency in the manufacturing process will become more important. Processes and devices that decrease the cost of manufacturing battery systems while simultaneously increasing their reliability and safety will be key to meeting customer demands. Specifically, there is a need for processes and devices that ensure reliable electrical connections between individual battery cells, that efficiently cool the battery system, and that aid in the manufacturing process of assembling the thousands of individual battery cells into modular systems that can be installed and replaced when necessary.

BRIEF SUMMARY OF THE INVENTION

Aspects of the present disclosure relate to battery systems and methods of making and/or manufacturing the battery systems, and some aspects of the present disclosure relate to removably fixable attachments between trays configured to house battery cells of a rechargeable battery system.

One inventive aspect is a method of manufacturing a battery pack for an electric vehicle. The method includes placing a first plurality of battery cells in a first battery cell holder of a battery system assembly press, placing a second plurality of battery cells in a second battery cell holder of the battery system assembly press, and placing a cooling duct in a gap between the first and second pluralities of battery cells. The method also includes applying a first force to the first plurality of battery cells and a second force to the second plurality of batteries, where the first and second forces cause the first and second pluralities of battery cells to press against the cooling duct, where the first plurality of battery cells is pressed against a first side of the cooling duct, where the second plurality of battery cells is pressed against a second side of the cooling duct, and where the first side of the cooling duct is opposite the second side of the cooling duct. The method also includes, while applying the first and second forces, placing the first and second plurality of battery cells in a first tray configured to hold the first and second plurality of battery cells.

In some embodiments, applying the first and second forces to the first and second plurality of battery cells causes the cooling duct to deform.

In some embodiments, the gap between the first and second pluralities of battery cells corresponds with a gap between the first and second battery cell holders.

In some embodiments, the first force is applied to the first plurality of batteries battery cells through the first battery cell holder, and the second force is applied to the second plurality of battery cells through the second battery cell holder.

In some embodiments, the first force is applied to the first battery cell holder with a first slide, and the second force is applied to the second battery cell holder with a second slide.

In some embodiments, the first and second forces cause first slide and the first battery cell holder to move with respect to the second slide and the second battery cell holder.

In some embodiments, the first and second slides and the first and second battery cell holders are slidably connected with at least one rail, and the first and second forces cause the first slide and the first battery cell holder to slide along the rail.

In some embodiments, the first and second forces cause the first plurality of batteries to move with respect to the second plurality of batteries, such that the size of the gap between the first and second plurality of batteries is reduced.

In some embodiments, the method also includes placing the first and second plurality of battery cells in a second tray configured to hold the first and second plurality of battery cells.

In some embodiments, at least one of the first and second trays is configured to apply a force to the first and second plurality of battery cells which causes the first and second plurality of battery cells to be pressed against the cooling duct.

In some embodiments, the method also includes removing the first and second pluralities of battery cells from the first and second battery cell holders prior to placing the first and second plurality of battery cells in the second tray.

In some embodiments, the method also includes attaching the upper tray to the lower tray.

In some embodiments, the method also includes electrically connecting the first plurality of battery cells to at least one first busbar, and electrically connecting the second plurality of battery cells to at least one second busbar.

Another inventive aspect is a battery system assembly press, including one or more rails, and first and second slides, each slidably connected to the one or more rails. The battery system also includes a plurality of battery cell holders each slidably connected to the one or more rails between the first and second slides, where the battery cell holders are each configured to hold a plurality of battery cells.

In some embodiments, the first and second slides have topological features which mate with corresponding features in the one or more rails such that the first and second slides are slidably connected to the one or more rails.

In some embodiments, the battery cell holders have topological features which mate with corresponding features in the one or more rails such that the battery cell holders are slidably connected to the one or more rails.

In some embodiments, the battery cell holders are each configured to hold two rows of battery cells.

In some embodiments, the two rows of battery cells are offset from one another such that the centers of the battery cells of one row are aligned with points between the battery cells of the other row.

In some embodiments, the battery cell holders are each configured to hold the battery cells such that the battery cells touch each other.

In some embodiments, the rails are configured to be fixed to a table.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Described herein are embodiments for providing methods of assembling a rechargeable battery system. The battery systems rechargeable battery systems include battery cells and a cooling duct configured to transfer heat away from the battery cells. The methods provide for effective thermal contact between the cooling duct and the battery cells.

In some embodiments, the cooling duct and the battery cells are loosely assembled, and are subsequently pressed mechanically pressed together with a battery system assembly press so as to generate good contact between the cooling duct and the battery cells.

Figure 1:
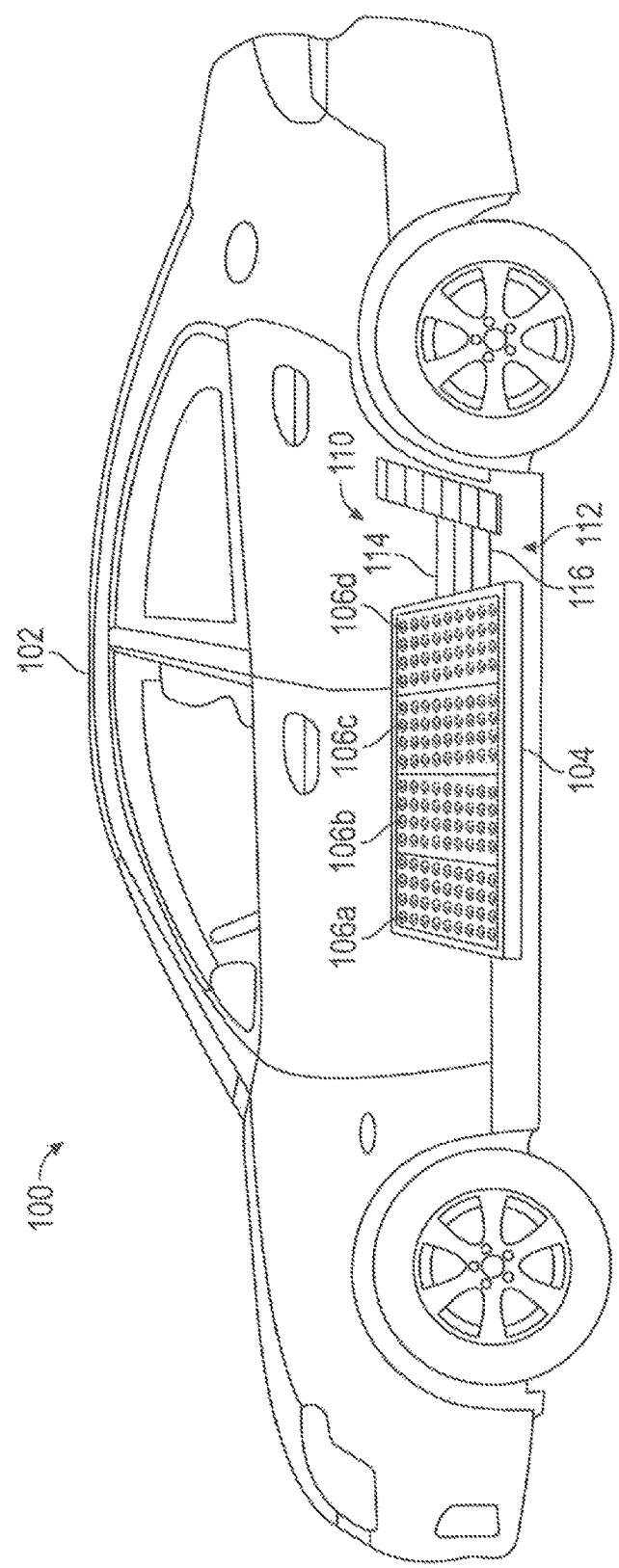
FIG. 1 illustrates a simplified diagram of an electric vehicle with a rechargeable battery system, according to some embodiments.

FIG. 1 illustrates a simplified diagram 100 of an electric vehicle 102 with a rechargeable battery system 104, according to some embodiments. The rechargeable battery system 104 may be comprised of one or more battery modules or packs 106. A battery pack may be comprised of a plurality of individual battery cells that are electrically connected to provide a particular voltage/current to the electric vehicle 102. In some embodiments, the battery cells forming the battery pack can be arranged in one or several rows of battery cells. Depending on the embodiment, the electric vehicle 102 may include hybrid vehicles that operate using both fuel combustion and stored electric power, as well as fully electric vehicles that operate entirely from stored electric power.

The rechargeable battery system 104 represents a major component of the electric vehicle 102 in terms of size, weight, and cost. A great deal of effort goes into the design and shape of the rechargeable battery system 104 in order to minimize the amount of space used in the electric vehicle 102 while ensuring the safety of its passengers. In some electric vehicles, the rechargeable battery system 104 is located under the floor of the passenger compartment as depicted in FIG. 1. In other electric vehicles, the rechargeable battery system 104 can be located in the trunk or in the hood areas of the electric vehicle.

While a smaller number of larger battery cells could be more energy-efficient, the size and cost of of these larger batteries are prohibitive. Furthermore, larger batteries require more contiguous blocks of space in the electric vehicle 102. This prevents larger batteries from being stored in locations such as the floor of the passenger compartment as depicted in FIG. 1. Therefore, some embodiments use a large number of smaller battery cells that are coupled together to generate electrical characteristics that are equivalent to single larger cells. The smaller cells may be, for example, the size of traditional AA/AAA batteries, and may be grouped together to form a plurality of battery packs 106. Each battery pack may include a large number of individual battery cells. In one embodiment, 700 individual lithium-ion batteries are joined together to form each of a number of single battery packs 106a, 106b, 106c, and 106d, and the rechargeable battery system 104 may include the four battery packs 106a, 106b, 106c, and 106d. In some embodiments, the rechargeable battery system 104 include eight battery packs, ten battery packs, sixteen battery packs, or another number of battery packs, connected in parallel or series until the electrical requirements of the electric vehicle 102 are satisfied. The individual battery cells included in each battery pack 106 may total in the thousands for a single electric vehicle 102.

In some embodiments, the rechargeable battery system 104, and specifically one or several of the battery packs 106 can be connected to a heat exchanger 108 that can be a part of a cooling system 110. In some embodiments, the cooling system 110 can be part of the rechargeable battery system 104 and in some embodiments, the cooling system 110 can be separate from the rechargeable battery system 104. The cooling system 110 can include connecting lines 112 that can fluidly connect the heat exchanger 108 to one or several of the battery packs 106. The connecting lines 112 can include an inlet line 114 and an outlet line 116. The inlet line 114 can transport a cooling fluid, such as a refrigerant to the rechargeable battery system 104 and/or to one or several battery packs 106. In some embodiments, the cooling fluid can be contained in the cooling system 110, in the rechargeable battery system 104, and/or in one or several battery packs 106.

Figure 2:
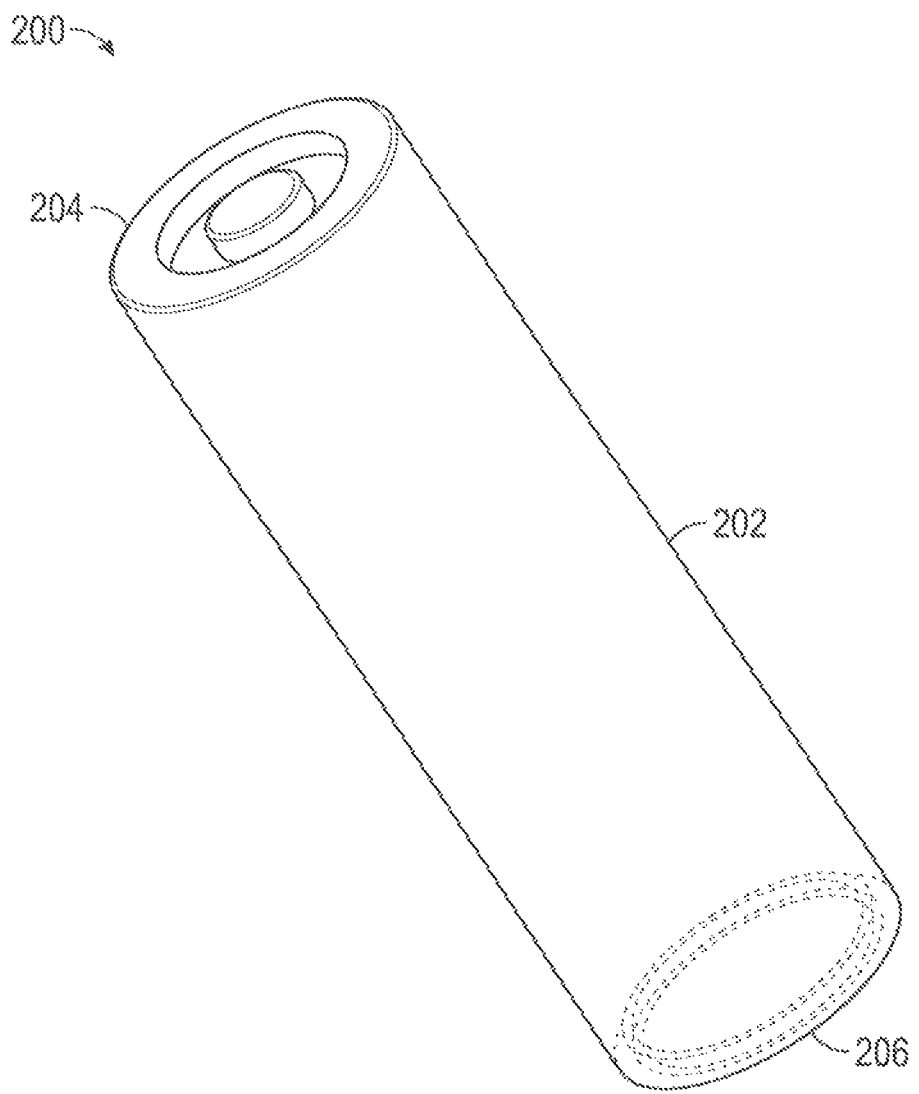
FIG. 2 illustrates a lithium-based battery that may be used in electric vehicles, according to some embodiments.

FIG. 2 illustrates a diagram 200 of a lithium-based battery 202 that may be used in electric vehicles, according to some embodiments. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic®, or some variation on the 18650 form-factor of 6.5 cm×1.8 cm and approximately 45 g. The battery 202 may have at least two terminals. In some embodiments, a positive terminal 204 may be located at the top of the battery 202, and a negative terminal 206 may be located on the opposite bottom side of the battery 202.

In some embodiments, some or all of the battery cells forming a battery pack 106 can be oriented in the same direction. In other words, the positive terminal of each of the individual battery cells may face in an upward (or downward) direction relative to the battery pack, and each of the negative terminals faces in a downward direction. In other embodiments, this need not be the case. Alternating rows of individual battery cells may be oriented in opposite direction such that the positive terminal of a first row is oriented in the up direction and the positive terminal of a second row is oriented in the downward direction. The orientation pattern for individual battery cells may vary without limitation. For example, every other battery cell in a row be oriented in opposite directions. In some embodiments, one half of the battery pack may have battery cells oriented in one direction, while the other half of the battery pack has cells oriented in the opposite direction. In any of these cases, connections may need to be established between batteries oriented in opposite directions or between batteries oriented in the same direction.

In order to make electrical connections between battery cells, a busbar may be used. As used herein, the term "busbar" refers to any metallic conductor that is connected to a plurality of individual battery cell terminals in order to transmit power from the individual battery cells to the electrical system of the electric vehicle. In some embodiments, the busbar may comprise a flat metallic sheet that is positioned on the top or the bottom of the battery pack. In some embodiments, the metallic sheet may cover an entire top or bottom of the battery pack, while in other embodiments, the busbar may comprise a strip that is longer than it is wide to interface with a single row of battery cells.

Figure 3:
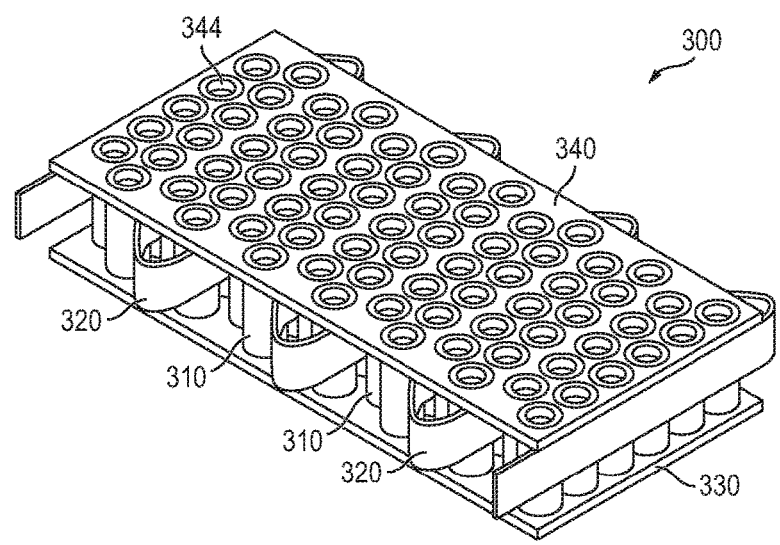
FIG. 3 is an illustration of a battery pack.

FIG. 3 is an illustration of battery pack 300, which includes battery cells 310, cooling duct 320, lower tray 330, and upper tray 340.

Battery cells 310 are arranged so as to engage indentations in lower tray 330 and upper tray 340. Because of the indentations, lower tray 330 and upper tray 340 provide mechanical support which resists lateral or shearing forces. In some embodiments, lower tray 330 and upper tray 340 are nonconductive. For example lower tray 330 and upper tray 340 may be formed with an injection molded plastic.

In addition, battery cells 310 are arranged so as to be supported by cooling duct 320. Cooling duct 320 includes fluid channels, through which a cooling fluid may be circulated so as to provide a path through which heat may be removed from the battery cells 310. Cooling duct 320 also provides mechanical support resisting lateral or shearing forces. In addition, cooling duct 320 provides mechanical support to the battery cells during manufacturing, as discussed further below.

One or more busbars (not shown) may be further mechanically connected with upper tray 340. For example, the busbars may be glued or welded to upper tray 34- so as to electrically contact the battery cells through holes 344.

One or more busbars (not shown) may be further mechanically connected with lower tray 330. For example, the busbars may be glued or welded to lower tray 330 so as to electrically contact the battery cells through holes in lower tray 330.

The busbars may include a plurality of contacts configured to electrically connect one or several portions and/or layers of the busbars with one or several battery cells 310, and specifically to the terminals of one or several battery cells 310. In some embodiments, one or several of the plurality of contacts can be electrically connected with one or several conductive layers of the busbar and/or with one or several conductive materials forming the busbar.

The battery cells 310 and the busbars may be oriented so as to provide any desired combination of serial and parallel connections among the batteries.

FIGS. 4A-4G is a series of views illustrating a process of manufacturing a battery pack, such as battery pack 300 of FIG. 3.

Figure 4A:
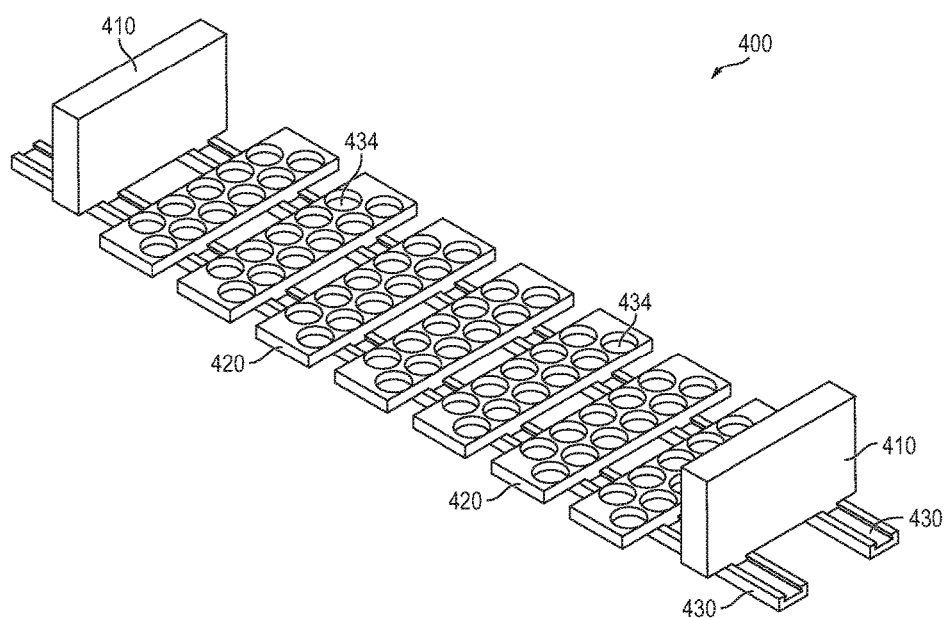
FIGS. 4A-4G is a series of views illustrating a process of manufacturing a battery pack.

FIG. 4A is an illustration of battery system assembly press 400. Battery system assembly press 400 includes slides 410, battery cell holders 420, and rails 430.

Slides 410 slidably engage rails 430 such that slides 410 are fixed to rails 430 and can slide along rails 430 in response to a lateral force applied thereto. For example, the rail 430 side of slides 410 may have topological features which mate with corresponding features in rails 430 such that the separation between slides 410 and rails 430 is limited and such that the slides 410 are free to slide along rails 430 in response to the lateral force applied thereto.

Battery cell holders 420 are each configured to hold a number of battery cells. For example, battery cell holders 420 may each be configured to hold two rows of battery cells. In some embodiments, the two rows are offset from one another such that the centers of the battery cells of one row are aligned with points between the battery cells of the other row. In some embodiments, the battery cells of each row are held by the battery cell holders 420 so as to be touching one another. In some embodiments, the battery cells of one row are held by the battery cell holders 420 so as to touch the battery cells of the other row.

Battery cell holders 420 slidably engage rails 430 such that battery cell holders 420 are fixed to rails 430 and can slide along rails 430 in response to a lateral force applied thereto. For example, the rail 430 side of battery cell holders 420 may have topological features which mate with corresponding features in rails 430 such that the separation between battery cell holders 420 and rails 430 is limited and such that the battery cell holders 420 are free to slide along rails 430 in response to the lateral force applied thereto.

In use, rails 430 may be fixed to a substantially immovable object, such as a table bolted to a floor. A lateral force may be applied to each of slides 410. In response to the forces applied thereto, slides 410 slide along rails 430 toward one another. The movement of slides 410 toward one another causes the battery cell holders 420 to slide along rails 430 until the battery cell holders 420 of each adjacent pair of battery cell holders 420 are pressed together.

Figure 4B:
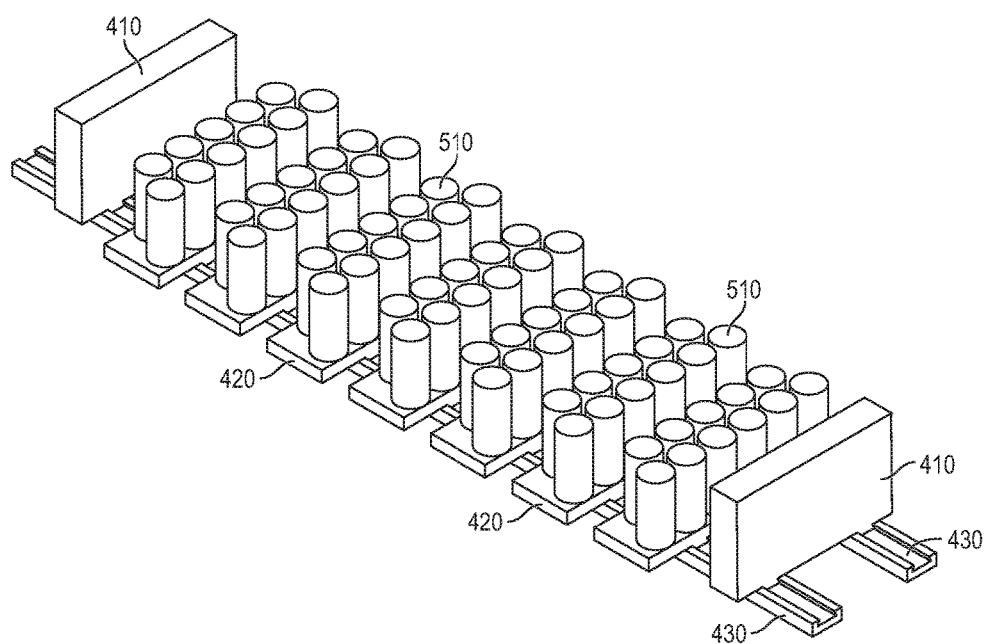

FIG. 4B is an illustration of battery system assembly press 400 having battery cell holders 420 populated with battery cells 510. As shown, each battery cell holder 420 holds a number of battery cells, where each of the battery cells 510 is in one of the indentations 434 of the battery cell holders 420, as shown in FIG. 4A.

As shown, at this point, the slides 410 and the battery cell holders 420 are spaced apart from one another.

Figure 4C:
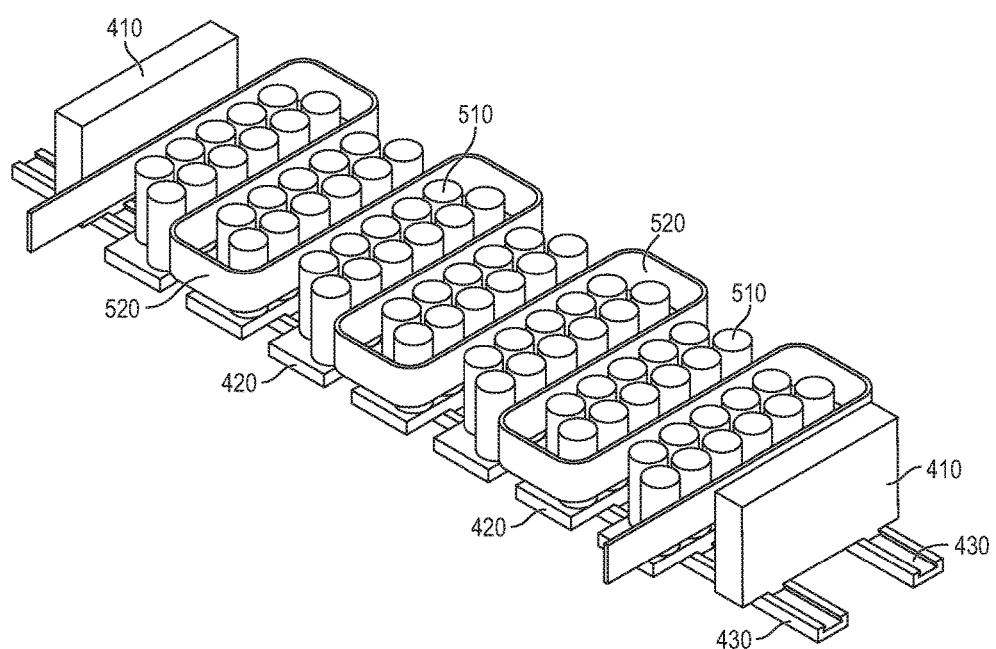

FIG. 4C is an illustration of battery system assembly press 400 having battery cell holders 420 populated with battery cells 510 and having cooling duct 520 routed among the battery cells 510. Battery cells 510 engage and are held in place by the indentations 434 of the battery cell holders 420, and cooling duct 520 provides additional mechanical support to the battery cells 510 during manufacturing, such that the battery cells 510 are less likely to be removed from battery cell holders 420 by, for example, lateral or other forces. Cooling duct 320 includes fluid channels, through which a cooling fluid may be circulated so as to provide a path through which heat may be removed from the battery cells 510.

As shown, at this point, the slides 410 and the battery cell holders 420 are spaced apart from one another.

Figure 4D:
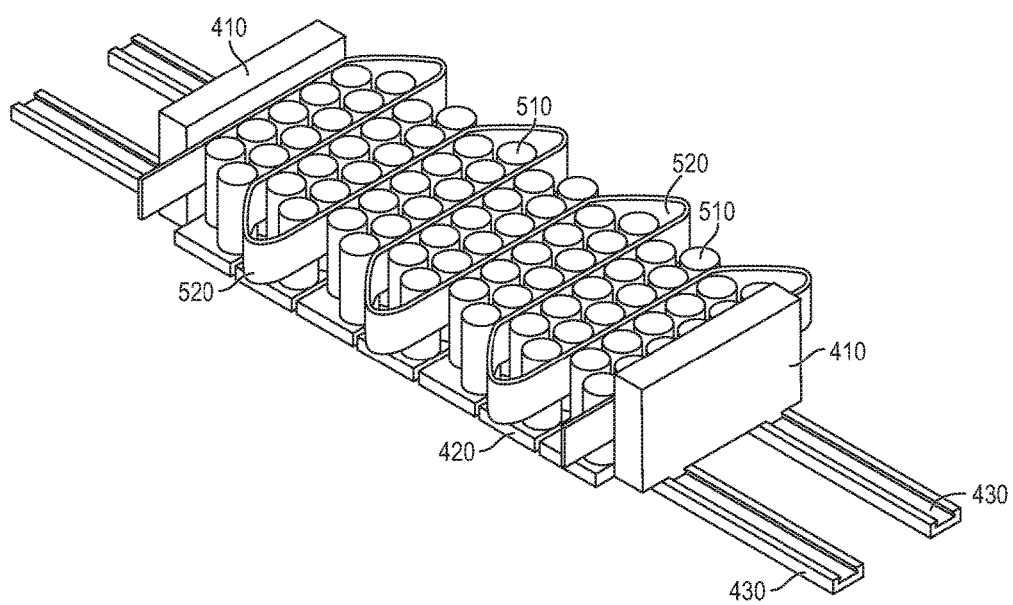

FIG. 4D is an illustration of battery system assembly press 400 having battery cell holders 420 populated with battery cells 510, having cooling duct 520 routed among the battery cells 510, and after battery system assembly press 400 has been actuated. As a result of lateral forces being applied to slides 410 in opposite directions, slides 410 have been pressed and have moved toward one another, pinching the battery cell holders 420, the battery cells 510, and the cooling duct 520 between the slides 410. As a result, each segment of the cooling duct 520 running between battery cells 510 is pressed between battery cells 510 on opposing sides of cooling duct 520. Depressing force exerted by the battery cells 510 on cooling duct 520 causes good thermal contact between the battery cells 510 and the cooling duct 520. As shown, portions of cooling duct 520 outside the regions occupied by battery cells 510 are deformed as a result of the pressing action of the lateral forces applied to slides 410.

Figure 4E:
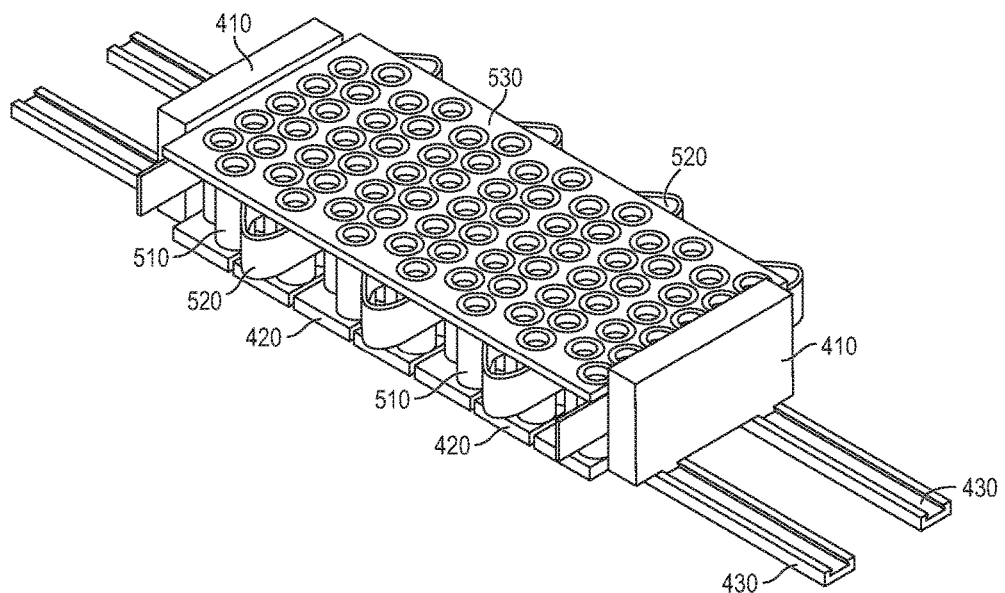

FIG. 4E is an illustration of battery system assembly press 400 having battery cell holders 420 populated with battery cells 510, having cooling duct 520 routed among the battery cells 510, after the battery cells 510 and the cooling duct 520 have been pressed together, and after lower tray 530 has been placed on the battery cells 510.

Lower tray 530 has been placed on battery cells 510 such that each of the battery cells 510 engages an indentation in lower tray 530 configured to receive one or more of the battery cells 510. As shown, lower tray 530 includes a plurality of holes each aligned so as to provide access to either a positive or a negative electrode of the battery cells 510, according to the orientation of each of the battery cells 510.

Figure 4F:
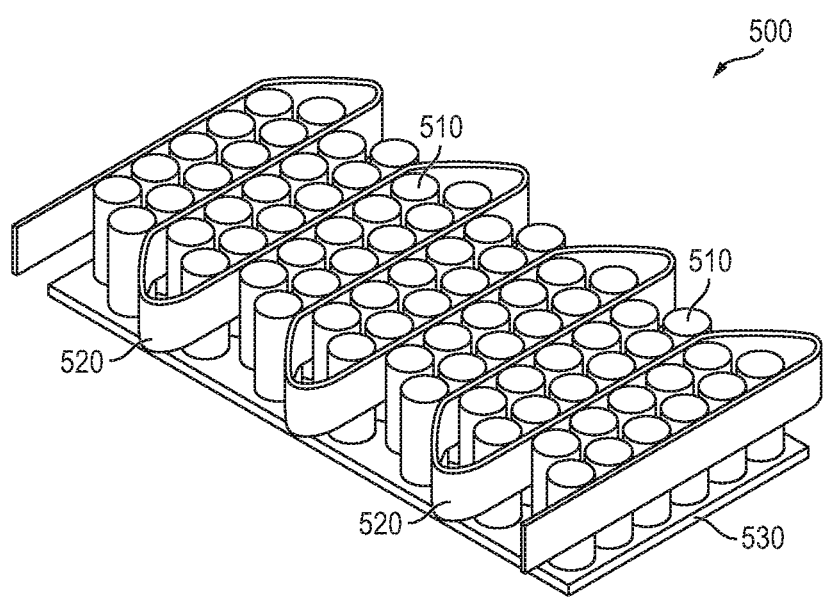

FIG. 4F is an illustration of battery system 500 partially formed with battery system assembly press 400. As a result of the actuation of battery system assembly press 400, battery cells 510 are pressed against cooling duct 520 routed among the battery cells 510, and has lower tray 530 placed on the far side of the battery cells 510, as viewed.

Figure 4G:
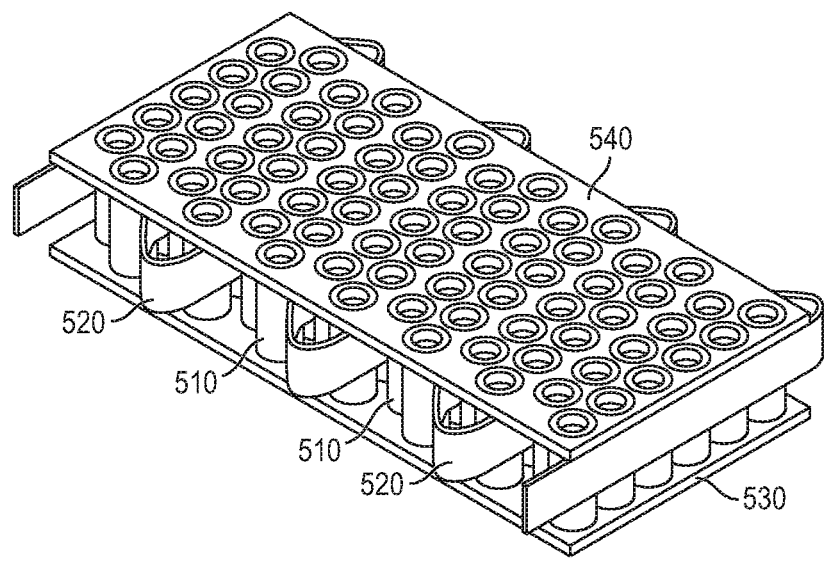

FIG. 4G is an illustration of of battery system 500 partially formed. As shown, upper tray 540 has been placed on battery cells 510 such that each of the battery cells 510 engages an indentation in the upper tray 540 configured to receive one or more of the battery cells 510. As shown, upper tray 540 includes a plurality of holes each aligned so as to provide access to either a positive or a negative electrode of the battery cells 510, according to the orientation of each of the battery cells 510.

Once the battery cells 510 are housed in lower tray 530 and upper tray 540, as shown in FIG. 4G, one or more busbars may be attached to lower tray 530 on the side opposite the battery cells 510. The one or more busbars may have contacts aligned with the holes in lower tray 530, such that when the one or more busbars are attached to lower tray 530, the one or more busbars are electrically connected to the battery cells 510 via the contacts.

Once the battery cells 510 are housed in lower tray 530 and upper tray 540, as shown in FIG. 4G, one or more busbars may be attached to upper tray 540 on the side opposite the battery cells 510. The one or more busbars may have contacts aligned with the holes in upper tray 540, such that when the one or more busbars are attached to upper tray 540, the one or more busbars are electrically connected to the battery cells 510 via the contacts.

In some embodiments, the one or more busbars of the lower tray 530 are attached to the lower tray 530 prior to the lower tray 530 receiving or being connected to the battery cells 510. Likewise, in some embodiments, the one or more busbars of the upper tray 540 are attached to the upper tray 540 prior to the upper tray 540 receiving or being connected to the battery cells 510.

Figure 5:
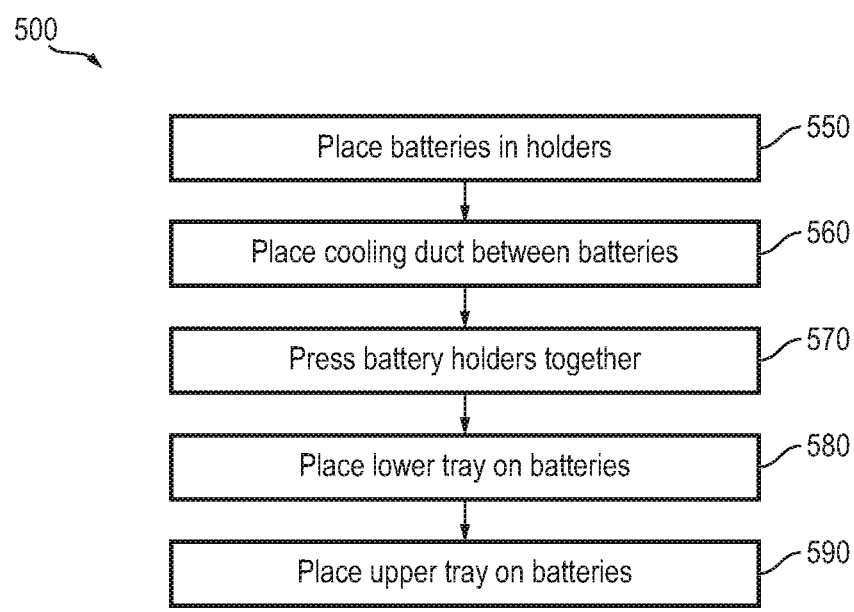
FIG. 5 is a flowchart illustrating an embodiment of a process for manufacturing a rechargeable battery pack.

FIG. 5 is a flowchart illustrating one embodiment of a process 500 for manufacturing a rechargeable battery pack, such as those discussed herein. The method can include, for example, a process for manufacturing one or several battery packs 106 of rechargeable battery pack system 104, discussed above with reference to FIG. 1.

The process begins at block 550, and may include placing a plurality of battery cells in each of a plurality of battery cell holders of a battery system press assembly. The battery cells may be placed so as to each have an orientation corresponding with a desired configuration of serial and parallel connections among the batteries.

At 560, the process 500 also includes routing a cooling duct among the battery cells. For example, the battery cells may be placed in a series of rows in the battery cell holders, where each of the rows is spaced apart from an adjacent row by a gap, and the cooling ducts may be routed among the battery cells in the gaps. In some embodiments, the cooling duct is routed between each pair of adjacent rows of the battery cells. In some embodiments, the cooling duct is routed between every other pair of adjacent rows of the battery cells. Other arrangements are additionally used.

In some embodiments, each battery cell holder of the battery system press assembly holds two rows of battery cells, and the cooling duct is routed between each battery cell holder.

At 570, the process 500 also includes pressing the battery cell holders together such that the cooling duct segments routed between adjacent rows of battery cells is compressed between the adjacent rows of battery cells. As a result, a good thermal connection is formed between the cooling duct and each of the battery cells of the adjacent rows of battery cells.

At 580, The process 500 also includes placing the battery cells in a lower tray. In some embodiments, the battery cells are fixed to the lower tray with, for example, a glue, an epoxy, or another fixing mechanism. In some embodiments, the battery cells are not fixed to the lower tray. The battery cells are placed in the lower tray such that the battery cells engage and are held in place by the indentations of the lower tray. In addition, the battery cells are placed in the lower tray such that the electrical terminals of the battery cells near the lower tray are aligned with holes in the lower tray so as to be accessible to an electrical contact.

At 590, The process 500 also includes placing the battery cells in an upper tray. In some embodiments, the battery cells are removed from the battery cell holders prior to placing the battery cells in the upper tray. In some embodiments, the battery cells are fixed to the upper tray with, for example, a glue, an epoxy, or another fixing mechanism. In some embodiments, the battery cells are not fixed to the upper tray. The battery cells are placed in the upper tray such that the battery cells engage and are held in place by the indentations of the upper tray. In addition, the battery cells are placed in the upper tray such that the electrical terminals of the battery cells near the upper tray are aligned with holes in the upper tray so as to be accessible to an electrical contact.

In some embodiments, once the batteries are placed in the lower tray and the upper tray, either or both of the lower tray and the upper tray exert forces on the battery cells which cause the battery cells to be pressed against the cooling duct.

The process 500 may additionally include attaching the upper tray to the lower tray. The upper tray may be attached to the lower tray such that an extension between upper tray and lower tray connects the upper tray and the lower tray. In some embodiments, the extension connects the upper tray and a lower tray with, for example, a glue, a weld, a threaded fastener, or another fixing mechanism.

The extension may also provide mechanical support protecting the battery cells from forces resulting from, for example, vertical impact. For example, battery pack may be configured such that the extension transfers a vertical force between the upper and lower trays and with no or substantially no vertical force being transferred by the battery cells themselves.

The process 500 may additionally include attaching busbars to the upper tray and to the lower tray. The busbars may be attached to the upper and lower trays such that contacts of the busbars form of electrical connections with the battery cells. In some embodiments, the busbars are connected to the upper and lower trays prior to the upper and lower trays receiving the battery cells. In some embodiments, the busbars are connected to the upper and lower trays after the upper and lower trays have received the battery cells.

In alternative embodiments, the battery cells are fixed to the busbars, for example, with a glue, or another attachment mechanism, such as a weld. In such embodiments, the battery cells may additionally be attached to the upper tray and/or lower tray by a glue or another attachment mechanism. In some embodiments, the battery cells are held against the upper tray and/or lower tray by the extension attaching the upper tray to the lower tray, and are not otherwise attached to the upper tray and/or lower tray. In some embodiments, one or more of the busbars exerts forces on the battery cells which cause the battery cells to be pressed against the cooling duct.

In alternative embodiments, the battery cells are not fixed to one or both of the upper and lower trays. In such embodiments, the upper tray may be connected to the lower tray by a glue or another attachment mechanism. In some embodiments, the battery cells are held against the upper tray and/or lower tray by the attachment mechanism attaching the upper tray to the lower tray, and are not otherwise attached to the upper tray and/or lower tray.

The process 500 may additionally include electrically connecting the rechargeable battery system with a motor configured to provide power to the vehicle.

It should be appreciated that the specific steps illustrated in FIG. 5 provide particular methods of providing a rechargeable battery system and/or a battery pack for an electric vehicle according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A battery system assembly press, comprising:
   one or more rails;
   first and second slides, each slidably connected to at least one of the one or more rails; and
   a plurality of battery cell holders, wherein each of the battery cell holders is separately slidably connected to at least one of the one or more rails between the first and second slides, wherein the battery cell holders substantially define a plane, and wherein the battery cell holders are each configured to hold a plurality of battery cells such that the battery cells each extend from the battery cell holders substantially perpendicularly from the plane,
   wherein the first and second slides are configured to slide along the one or more rails in a direction substantially parallel with the plane.

2. The battery system assembly press of claim 1, wherein the first and second slides have topological features which mate with corresponding features in the one or more rails such that the first and second slides are slidably connected to the one or more rails.

3. The battery system assembly press of claim 1, wherein the battery cell holders have topological features which mate with corresponding features in the one or more rails such that the battery cell holders are slidably connected to the one or more rails.

4. The battery system assembly press of claim 1, wherein the battery cell holders each comprise a plurality of topological features corresponding to topological features of battery cells whereby the battery cell holders are each configured to hold two rows of battery cells.

5. The battery system assembly press of claim 4, wherein the two rows of battery cells are offset from one another such that the centers of the battery cells of one row are aligned with points between the battery cells of the other row.

6. The battery system assembly press of claim 1, wherein the battery cell holders are each shaped to hold the battery cells such that the battery cells touch each other.

7. The battery system assembly press of claim 1, wherein the rails are fixed to a table.

* * * * *